May 31, 1966  A. EBERHARD ETAL  3,253,580
ROTARY PISTON ENGINE
Filed May 21, 1962  3 Sheets-Sheet 1

INVENTORS.
ALBERT EBERHARD
WOLFGANG HÖSCHELE
ERWIN EISELE
BY
Dicke & Craig
ATTORNEYS.

INVENTORS
ALBERT EBERHARD
WOLFGANG HÖSCHELE
ERWIN EISELE

BY Dicke & Craig
ATTORNEYS

May 31, 1966 A. EBERHARD ET AL 3,253,580
ROTARY PISTON ENGINE
Filed May 21, 1962 3 Sheets-Sheet 3

INVENTORS
ALBERT EBERHARD
WOLFGANG HÖSCHELE
ERWIN EISELE
BY
Dicke + Craig
ATTORNEYS.

United States Patent Office 3,253,580
Patented May 31, 1966

3,253,580
ROTARY PISTON ENGINE
Albert Eberhard, Rommelshausen, Kreis Waiblingen, Wolfgang Höschele, Gerlingen, Kreis Leonberg, and Erwin Eisele, Stuttgart, Germany, assignors to Daimler-Benz Aktiengesellschaft, Stuttgart-Unterturkheim, Germany
Filed May 21, 1962, Ser. No. 196,172
Claims priority, application Germany, May 25, 1961, D 36,170
26 Claims. (Cl. 123—8)

The present invention relates to a rotary piston internal combustion engine in which a three-cornered piston is eccentrically supported on the driven shaft within a housing having an internal boundary provided with two zones in proximity to the axis, and in which the piston during the movement thereof relative to the housing and to the driven or output shaft glides along the internal boundary with the corners thereof and therewith valves the gas interchange channels.

With internal combustion engines of this type, it is impossible with a rational ratio of working space to structural size to obtain sufficiently large theoretical compression ratios which would permit to arrange nearly the entire compression volume within a combustion chamber in the piston and therewith the structural prerequisite for a favorable application of the diesel operation. The present invention is, therefore, concerned with the aim to construct such rotary piston internal combustion engines in such a manner that very large theoretical compression ratios may be attained and nearly the entire compression volume may be arranged in a compact combustion chamber combined in the piston.

As solution of this problem, the present invention essentially consists in supporting the piston eccentrically with respect to the output shaft as well as also eccentrically to this eccentric support on the output shaft and in controlling the movement thereof in such a manner that it rotates, on the one hand, relative to the one eccentric bearing support and, on the other, relative to the other eccentric bearing support. It is possible to achieve by the bearing support and control of the piston in accordance with the present invention cross sectional shapes for the internal boundary within the housing and piston shapes in which in the position of compression of the piston, the latter approaches the internal boundary with the requisite play or tolerance at which theoretical compression ratios of $\epsilon > 200$ are realizable and at which the arrangement of a combustion space shaped in accordance with considerations of combustion techniques is possible within the piston.

According to a further feature of the present invention, the piston may be rotatably supported advantageously on an eccentric bushing or sleeve and controlled by suitable transmission means to rotate relative to this eccentric bushing and the eccentric bushing, in its turn, may be rotatably supported on an eccentric rigid with the driven shaft and controlled by transmission means to rotate relative to the driven shaft.

Particularly favorable structural conditions may be achieved by so arranging and constructing the transmission means that the absolute angular velocities of the piston, of the driven shaft and of the eccentric bear a ratio to each other of 1 to 3 to 6, preferably however, 1 to 3 to −3.

The transmission means for the control of a piston and of the eccentric bushing may consist in a simple manner of rotating gear means. In that connection, there may be provided at the piston side for controlling the piston, two mutually meshing rotating central gears of which one gear is arranged rigidly at the piston and the other at the driven shaft or eccentric, and there may be arranged, at the other piston side, for controlling the eccentric bushing, a ring gear at the housing sidewall with which meshes a rotating gear rigid at the eccentric bushing.

However, the transmission means may also consist of a guide track rigid at the housing along which the piston is guided by means of guide rollers and of a rotating gear transmission by means of which is controlled the movement of the eccentric bushing.

The transmission means for the control of the eccentric bushing may thereby consist of two mutually connected central or ring gears supported on the driven shaft whereby a rotating gear rigid at the eccentric bushing meshes with the one ring gear and the other ring gear is operatively connected by means of a rotating gear supported at the housing with a sun gear rotating in unison with the output shaft.

For purposes of controlling the piston by means of guide tracks rigid at the housing, there may be arranged at the piston three, preferably elastically yielding guide rollers. Additionally, the major axis of the guide track may be advantageously displaced by 90° to the major axis of the internal boundary in the housing.

According to a modified embodiment in accordance with the present invention, there may be arranged with an internal combustion engine, especially in the construction thereof as diesel engine in each of the piston sides or flanks extending between two corners of the piston, a combustion-space depression or recess extending in the longitudinal direction of the flank, the volume of such combustion space depression or recess corresponding essentially to the compression volume.

The cross section of each combustion space may be constructed essentially of rectangular shape, omega shape or trapezoidal shape. However, the cross section of each combustion space depression may also consist of an essentially trapezoidally shaped part having a semicircular part adjoining the same.

The lower boundary of the combustion space depression, may, as viewed in longitudinal cross section, be disposed approximately along an arc of a circle. However, the lower boundary may also be inclined or rise, in a direction opposite to the direction of rotation of the piston, within the leading depression portion as viewed in the direction of rotation of the piston.

An injection valve preferably constructed as a multi-apertured nozzle may be provided at the housing of the internal combustion engine which injects fuel against the bottom of the combustion-space depression arranged within the piston. However, the injection valve may also be so constructed and arranged that it injects fuel against the upper parts of the lateral walls of the combustion-space depression. Furthermore, the injection valve may additionally inject fuel against a raised portion arranged at the bottom of the combustion-space recess, for example, against a depression crest portion with an omega-shaped combustion-space depression.

Accordingly, it is an object of the present invention to provide a rotary piston internal combustion engine of the type described hereinabove, which eliminates, by simple means and in an effective manner, the drawbacks and shortcomings encountered with the prior art constructions.

It is another object of the present invention to provide a rotary piston internal combustion engine construction which renders possible an engine design suitable for diesel operation.

Still a further object of the present invention resides in the provision of a rotary piston internal combustion engine of the type described hereinabove in which, with a rational ratio of working space to overall dimension, a sufficiently large theoretical compression ratio is realizable which permits to arrange nearly the entire compression volume within a combustion chamber disposed in the rotating piston.

A further object of the present invention resides in the provision of a rotary piston internal combustion engine in which a compact combustion chamber is arranged within the piston that combines nearly the entire compression volume at a very large theoretical compression ratio.

Still another object of the present invention resides in the provision of a rotary piston internal combustion engine construction having means effectively providing a dual eccentric movement of the rotary piston relative to the internal boundary of the engine housing.

These and other objects, features and advantages will become more obvious from the following description when taken in connection with the accompanying drawing which shows, for purposes of illustration only, several embodiments in accordance with the present invention in relation to a construction of a triangularly-shaped piston within a two-arched internal boundary, schematically illustrated only, and wherein FIGURE 1 is a schematic explanatory diagram for the kinematics of an internal combustion engine in accordance with the present invention;

Figure 7:
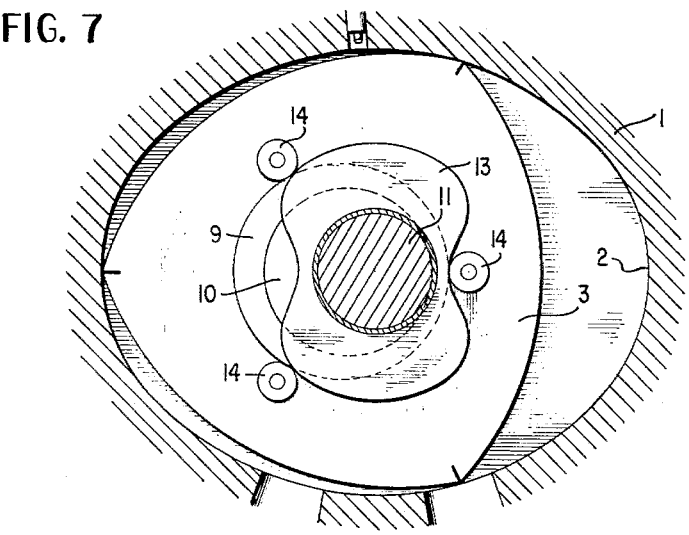

FIGURE 7 is a schematic cross sectional view of a guide track arrangement for the control of the piston in accordance with the present invention, and FIGURES 8a and 8b to 14a and 14b are, respectively, partial transverse and corresponding longitudinal cross sectional views through different embodiments of different shapes of combustion-space depressions in the piston of an internal combustion engine according to the present invention.

Figure 1:
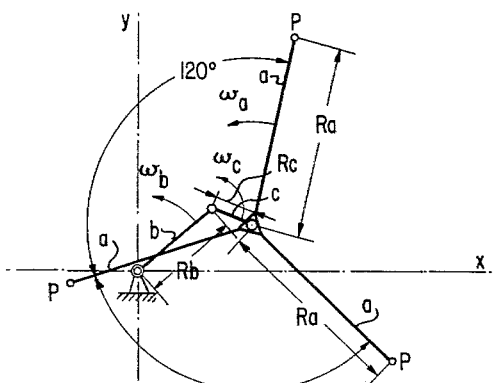
Figure 2:
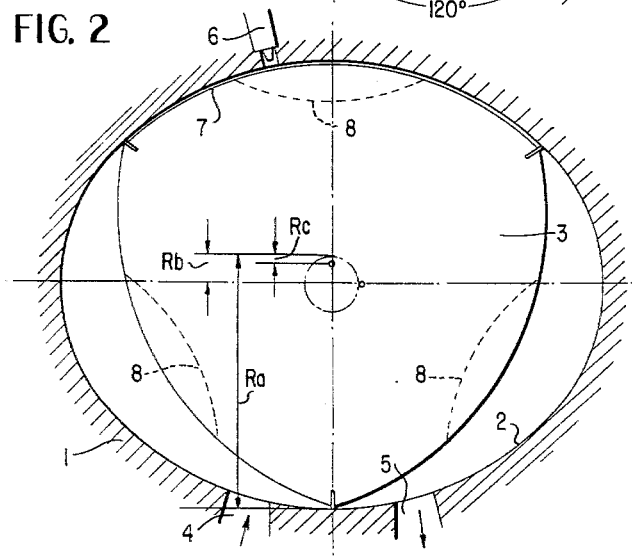
FIGURE 2 is a schematic cross sectional view through an internal combustion engine in acordance with the present invention.

Referring now to the drawing, wherein like reference numerals are used throughout the various views to designate like parts, the generation of the most significant shapes of an internal combustion engine according to the present invention, namely the contour of the inner boundary wall along which slides the piston with the corners thereof, the contour of the piston and additionally the movement conditions of the piston may be readily illustrated according to FIGURE 1 by reference to a three-jointed linkage system rotating about the origin of the fixed $xy$ coordinate system, the respective members or links of which are designated by reference characters $a$, $b$ and $c$. The member $a$ indicates three end points P arranged mutually displaced by 120° and corresponding to the three corners of the piston. The absolute angular velocities $\omega$ of the three members $a$, $b$ and $c$ bear a fixed ratio to each other of $$\omega_a : \omega_b : \omega_c = 1 : k_1 : k_2$$

whereby $k_1 = 3$ and $k_2 = 6, 9, 12 \ldots$ or $-3, -6, -9$ . . . in order to achieve that the three end points P of the member $a$ always run along the same path of the inner boundary wall of the housing. The form of the inner boundary wall and of the piston is determined, in addition to being determined by the rotary speed ratios $\omega_a : \omega_b : \omega_c$, by the ratios of the radii $R_a : R_b : R_c$ of the generating radii and from the initial position of these radii. The initial positon of the radii $R_a$, $R_b$ and $R_c$ is visible from FIGURE 2 in which the housing of the internal combustion engine for which holds the ratio $\omega_a : \omega_b : \omega_c = 1 : 3 : -3$, is designated by reference numeral 1 whereas the internal boundary thereof is designated in this figure by reference numeral 2 and the triangular piston by reference numeral 3. The internal boundary 2 has an elipse-like shape and is provided with two zones in proximity of the axis thereof, i.e., with two regions approaching the axis. The inlet channel 4 and the outlet channel 5, to be referred to hereinafter as "gas exchange channels," are arranged in proximity to one of the zones arranged in proximity to the axis whereas the injection valve 6 is located in the area of the opposity disposed zone in proximity to the axis. The piston 3, in the position thereof shown in this figure in full line assumes its position of compression. The entire piston flank or piston side 7 disposed between two corners of the piston approaches closely the internal boundary 2 so that nearly the entire compression volume may be accommodated within the combustion-space depression 8 arranged within the piston flank 7.

Figure 3:
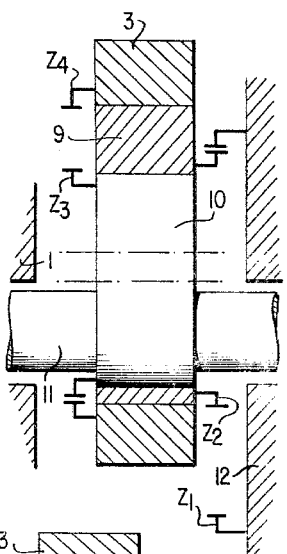
FIGURE 3 is a longitudinal cross sectional view through an internal combustion engine according to the present invention provided with rotatable gear transmission means for controlling the piston and the eccentric bushing.

The piston 3 is supported, as illustrated in particular in FIGURE 3, for purposes of achieving the double planetary movement thereof on an eccentric bushing 9 which, in turn, is arranged on the eccentric 10. The eccentric 10 forms one part together with the driven shaft 11 which is suitably supported within the housing 1. In order to achieve the angular velocity ratios of $\omega_a : \omega_b : \omega_c$ of, for example, $1 : 3 : -3$ mentioned in connection with FIGURE 1, there are provided rotary gear means for purposes of controlling the piston 3 and the eccentric bushing 9. The one rotary gear transmission which serves for controlling the eccentric bushing 9 consists of the central or internally toothed gear $z_1$ rigidly secured at the housing side wall 12 with which meshes the central or externally-toothed gear $z_2$ rigid at the eccentric bushing 9. The other rotary gear transmission serving for purposes of controlling the piston 3 consists of the central or externally-toothed central gear $z_3$ rigid at the eccentric 10 and of the central or internally toothed gear $z_4$ meshing therewith which is secured at the piston 3. In order to attain the aforementioned angular speed velocity ratios, the following teeth ratio are necessary:

$$z_1/z_2 = 2 \text{ and } z_3/z_4 = 2/3.$$

Figure 4:
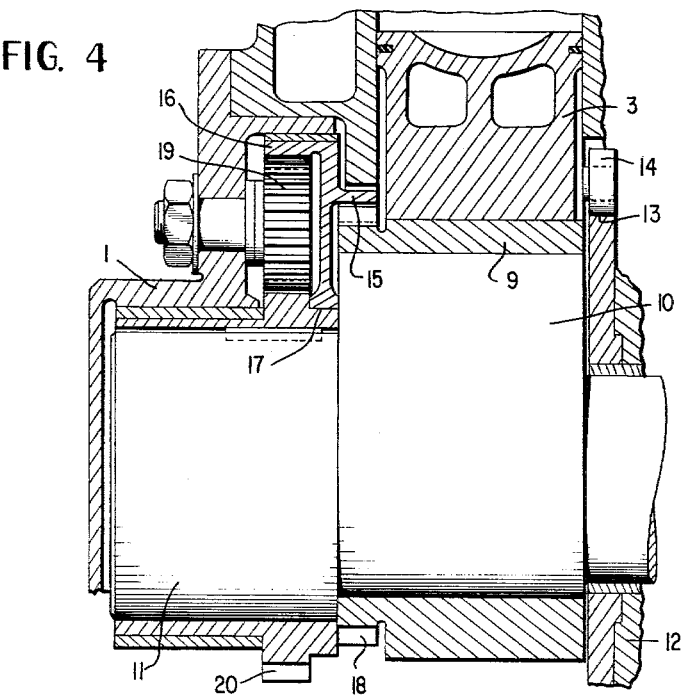
FIGURE 4 is a longitudinal cross sectional view through a modified embodiment of an internal combustion engine in accordance with the present invention in which the eccentric bushing is controlled by a rotatable gear transmission and the piston by a guide track arrangement.

FIGURE 4 illustrates a modified embodiment which shows that the gear transmission controlling the piston 3 may be replaced by a guide track 13 arranged securely at the housing side wall 12 along which the piston 3 is guided by means of suitable guide rollers 14. The gear transmission for purposes of controlling the eccentric bushing 9 consists, as also indicated schematically in FIGURE 5 of the two central or internally toothed gears 15 and 16 arranged one behind the other in the axial direction which are suitably journalled or supported at 17 on the driven shaft 11. The central or externally toothed gear 18 rigid at the eccentric bushing 9 meshes with the ring gear 15 whereas the ring gear 16 is operatively connected by means of planet gear 19 supported at the housing 1 with the sun gear 20 rigid at the driven shaft 11.

Figures 5, 6:
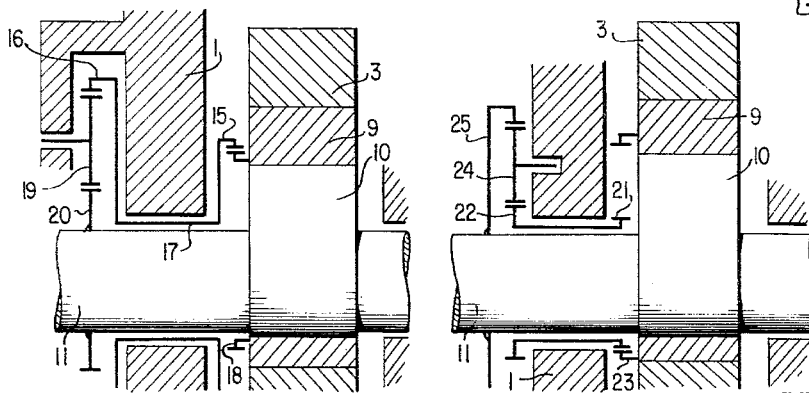
FIGURE 5 is a cross sectional view of a simplified representation of the control of the eccentric bushing according to FIGURE 4.
FIGURE 6 is a partial cross sectional view of a modified embodiment indicating a schematic simplified representation of a control arrangement for the eccentric bushing in accordance with the present invention.

With the gear transmissions according to FIGURES 4 and 5, a part of the transmission is disposed outside the space between the two side walls of the housing and the lateral boundary of the piston in order to make possible to construct the transmission sufficiently large and in order to achieve as small as possible a distance of the shaft bearings. Additionally, the embodiment according to FIGURE 4 shows a transmission construction which permits the arrangement of a relatively stronger shaft stub at the driven shaft 11.

FIGURE 6 illustrates a transmission for the control of the eccentric bushing 9 similar to the gear transmission of FIGURE 5. The two sun gears 21 and 22 operatively connected with each other and disposed one behind the other in the axial direction of the shaft 11 are suitably supported thereon. The sun gear 21 meshes with the central or internally toothed gear 23 rigid at the eccentric bushing 9. The sun gear 22 is operatively connected through the rotatable gear 24 supported at the housing 1 with the ring gear 25 rigid at the driven shaft 11.

FIGURE 7 illustrates a control of the piston 3 by means of guide track system 13 visible also in FIGURE 4 in cross section through the internal combustion engine according to the present invention. The major axis of the two-arched guide track 13 is disposed perpendicularly to the major axis of the internal boundary 2. The piston 3 is guided along this guide track 13 by means of three rollers 14. The control of the eccentric bushing 9 takes place by means of a gear transmission such as illustrated either in FIGURE 5 or FIGURE 6.

Since the internal combustion engines of the type described hereinabove permit the accommodation of a compact combustion space as recess or depression in the piston flank or side which closely adjoins in the point of maximum compression the internal boundary of the engine housing, there may be utilized for the mixture formation between the fuel injected during the compression stroke and the air charge of the combustion space two effects possible with engines of this type. At first, there is produced an intensive air movement tangentially over the piston circumferential surface by the squeeze and displacement movement occurring during the compression stroke between the approaching housing wall and piston flank and thereupon, after the compression dead center point during the expansion stroke, by the combustion space increase occurring at first at the leading piston-combustion space surface. This effect is utilized with the combustion space arrangements according to FIGURES 8a and 8b and FIGURES 9a and 9b. In the construction according to FIGURES 8a and b, there is utilized an injection essentially against the bottom 27 of the combustion space depression 8 provided in the piston flank 7 by means of a pin or throttling pin nozzle (not shown) which injects a wide conical fuel jet or with multi-apertured nozzles (not illustrated) the jets 26 of which impinge, as viewed in the circumferential direction of the piston 3, adjacent to and/or behind one another against the bottom 27. The squeeze flow of the combustion air is indicated therein by reference numeral 28.

Figure 9B:
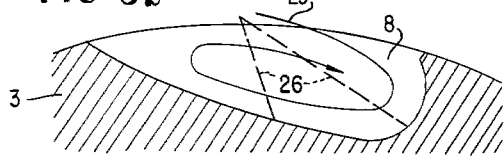
Figure 8B:
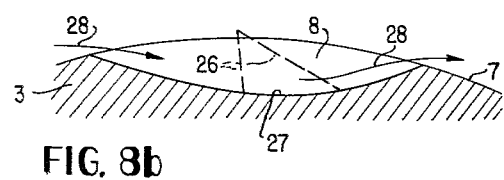
Figure 9A:
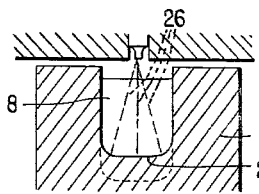
Figure 8A:
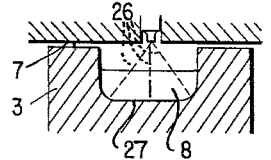

In the embodiment of FIGURES 9a and 9b, the aforementioned tangential circumferential squeeze flow is directed, by the illustrated construction of the combustion space depression 8, for the formation of a vertical vortex or eddying which produces the mixture formation by passing again over the fuel films or surfaces, resulting from the fuel jets 26 and placed over the depression bottom 27 by the aforementioned nozzles.

The second effect which may be utilized to advantage in a construction according to the present invention, is the forcible or positive separation between the lighter combustion gases and the more heavy colder and uncombusted air according to the specific weight with the aid of the centrifugal force field of the piston rotation effective perpendicularly to the piston axis. As a result thereof, the hot lighter combustion gases seek to move immediately after the production thereof centripedally to the depression bottom. The fuel is again injected with the aid of a multi-apertured nozzle the jets of which may be arranged again adjacent to and behind one another as viewed in the circumferential direction of the rotor, against portions of the depression walls disposed as far outwardly as possible and is prepared thereat by the specific heavy outwardly concentrating air passing the same. The combustion space depressions which utilize these two effects are illustrated in detail in FIGURES 10a and 10b to 14a and 14b.

Figure 10B:
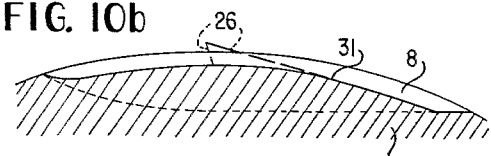
Figure 10A:
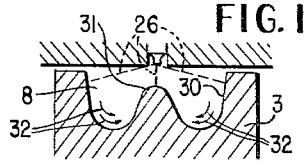

In the embodiments of FIGURES 10a and 10b, the fuel jets 26 impinge against the side walls 30 of the combustion space depression 8 of omega-shape in cross section and against the raised center portion 31. The movement of the gases under the influence of the centrifugal force is indicated by arrows 32.

Figure 11B:
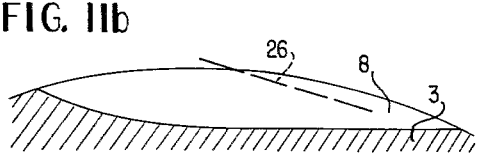
Figure 11A:
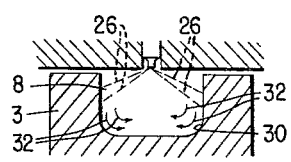

Injection takes place also into the combustion space recess 8 of rectangular cross section according to FIGURES 11a and 11b in such a manner that the fuel jets impinge against the side walls 30 of the combustion space depression. The movement of the gases under the influence of the centrifugal force is indicated by arrows 32.

Figure 12B:
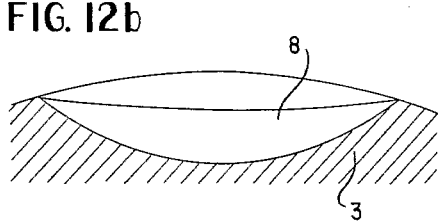
Figure 13B:
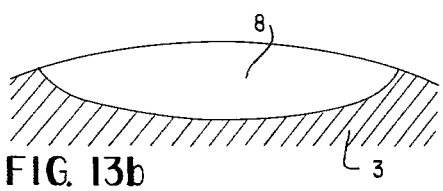
Figure 14B:
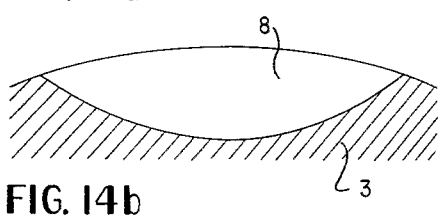
Figure 12A:
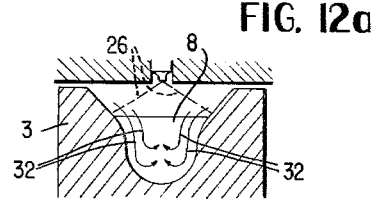
Figure 13A:
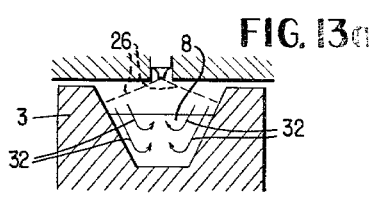
Figure 14A:
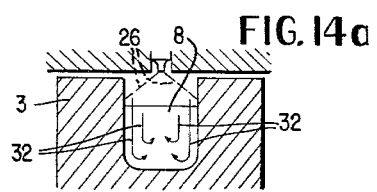

In the following embodiments of which FIGURES 12a and 12b illustrate a combustion space depression 8 circular in cross section and having inclined side walls 13, FIGURES 13a and 13b, a combustion space recess 8 trapezoidally shaped in cross section, and FIGURES 14a and 14b a combustion space recess 8 rectangular in cross section, the fuel jets directed against the side walls are indicated in each case by reference numerals 26 and the movements of the gases under the influence of the centrifugal force in each case by reference numeral 32.

While we have shown and described several embodiments in accordance with the present invention, it is understood that the same is not limited thereto, but is susceptible of many changes and modifications within the spirit and scope of the present invention, and we therefore do not wish to be limited to the details shown and described herein, but intend to cover all such changes and modifications as are encompassed by the scope of the appended claims.

We claim:

1. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first eccentric supporting means for eccentrically supporting said piston with respect to said output shaft, second means rotatable relative to said first means for eccentrically supporting said piston with respect to said first-mentioned eccentric supporting means, and means for controlling the rotary movements of said piston relative to said second eccentric supporting means and relative to said first eccentric supporting means as well as the relative rotary movements between said first and second means.

2. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means.

3. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first eccentric supporting means for eccentrically supporting said piston with respect to said output shaft, second means rotatable relative to said first means for eccentrically supporting said piston with respect to said first-mentioned eccentric supporting means, and means for controlling the rotary movements of said piston relative to said second eccentric supporting means and relative to said first eccentric supporting means as well as the relative rotary movements between said first and second means in such a manner that the absolute angular velocities of said piston, of said output shaft and of said second means have respective ratios of 1:3:6.

4. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first eccentric supporting means for eccentrically supporting said piston with respect to said output shaft, second means rotatable relative to said first means for eccentrically supporting said piston with respect to said first-mentioned eccentric supporting means, and means for controlling the rotary movements of said piston relative to said second eccentric supporting means and relative to said first eccentric supporting means as well as the relative rotary movements between said first and second means in such a manner that the absolute angular velocities of said piston, of said output shaft and of said second means have respective ratios of 1:3:—3.

5. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first eccentric supporting means for eccentrically supporting said piston with respect to said output shaft, second means rotatable relative to said first means for eccentrically supporting said piston with respect to said first-mentioned eccentric supporting means, rotary gear transmission means for controlling the rotary movements of said piston relative to said second eccentric supporting means and relative to said first eccentric supporting means, and means controlling the realtive movements of said first and second means.

6. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first means including eccentric means rigidly secured at said output shaft for eccentrically supporting said piston with respect to said output shaft, second means including eccentric bushing means rotatably supported on said first-mentioned eccentric means for eccentrically supporting said piston with respect to said first-mentioned eccentric means, and control means including first transmission means for controlling the rotary movements of said piston relative to the eccentric busing means of said second eccentric supporting means and second transmission means for controlling the rotary movements of said eccentric bushing means relative to the first-mentioned eccentric means of said first eccentric supporting means in such a manner that the ratios of the absolute angular velocities of said piston, of said output shaft and of said eccentric bushing means are 1:3:6.

7. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising first means including eccentric means rigidly secured at said output shaft for eccentrically supporting said piston with respect to said output shaft, second means including eccentric bushing means rotatably supported on said first-mentioned eccentric means for eccentrically supporting said piston with respect to said first-mentioned eccentric means, and control means including first transmission means for controlling the rotary movements of said piston relative to the eccentric bushing means of said second eccentric supporting means and second transmission means for controlling the rotary movements of said eccentric bushing means relative to the first-mentioned eccentric means of said first eccentric supporting means in such a manner that the ratios of the absolute angular velocities of said piston, of said output shaft and of said eccentric busing means are 1:3:—3.

8. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means, said first transmission means including two meshing gears disposed on one piston side of which one gear is arranged at said piston and the other gear at one of the two parts consisting of said output shaft and said first-mentioned eccentric means, and said second transmission means including two meshing gears disposed on the other piston side of which one gear is arranged at the housing side wall and the other gear at said eccentric bushing means.

9. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means secured at said housing and guide roller means for guiding said piston on said guide track means.

10. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means secured at said housing and guide roller means for guiding said piston on said guide track means, said second gear transmission means including two ring gears rotatably supported on said output shaft and operatively connected with each other, a further gear operatively connected with said eccentric bushing means for rotation in unison therewith, one of said two ring gears meshing with said further gear, a sun gear operatively connected with said output shaft for rotation in unison therewith, and another gear rotatably supported at said housing and in meshing engagement with both the other ring gear and said sun gear to establish an operative connection therebetween.

11. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means having a major axis and secured at said housing and three guide roller means for guiding said piston on said guide track means, said guide roller means being arranged at said piston in an elastically yielding manner, said second gear transmission means including two ring gears rotatably supported on said output shaft and operatively connected with each other, a further gear operatively connected with said eccentric bushing means for rotation in unison therewith, one of said two ring gears meshing with said further gear, a sun gear operatively connected with said output shaft for rotation in unison therewith, and another gear rotatably supported at said housing and in meshing engagement with both the other ring gear and said sun gear to establish an operative connection therebetween, and the major axis of said guide track means being arranged displaced substantially by 90° with respect to the major axis of said inner boundary.

12. A rotary piston internal combustion engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means having a major axis and secured at said housing and three guide roller means for guiding said piston on said guide track means, said guide roller means being arranged at said piston in an elastically yielding manner, and the major axis of said guide track means being arranged displaced substantially by 90° with respect to the major axis of said inner boundary.

13. A rotary piston internal combustion engine constructed as diesel engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising a combustion space in the form of a depression in each of the piston flanks disposed between two piston corners, each combustion space extending in the longitudinal direction of the respective piston flank and corresponding essentially to the compression volume, means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means having a major axis and secured at said housing and three guide roller means for guiding said piston on said guide track means, said guide roller means being arranged at said piston in an elastically yielding manner, said second gear transmission means including two ring gears rotatably supported on said output shaft and operatively connected with each other, a further gear operatively connected with said eccentric bushing means for rotation in unison therewith, one of said two ring gears meshing with said further gear, a sun gear operatively connected with said output shaft for rotation in unison therewith, and another gear rotatably supported at said housing and in meshing engagement with both the other ring gear and said sun gear to establish an operative connection therebetween, and the major axis of said guide track means being arranged displaced substantially by 90° with respect to the major axis of said inner boundary.

14. A rotary piston internal combustion engine constructed as diesel engine in which a triangular piston is eccentrically supported on the output shaft within a housing provided with an internal boundary having two zones in proximity to the axis, and in which the piston during movement thereof relative to said housing and to said output shaft slides with the corners thereof along said internal boundary and thereby valves the gas exchange channels of the engine, comprising a combustion space in the form of a depression in each of the piston flanks disposed between two piston corners, each combustion space extending in the longitudinal direction of the respective piston flank and corresponding essentially to the compression volume, means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second rotatable gear transmission means for controlling the rotary movements of said eccentric bushing means relative to said first-mentioned eccentric means, said first transmission means including guide track means secured at said housing and three guide roller means for guiding said piston on said guide track means, said guide roller means being arranged at said piston in an elastically yielding manner.

15. In a rotary piston internal combustion engine in which a polygonal piston is eccentrically supported on a driven shaft within a housing having an internal boundary provided with at least two zones in proximity to the axis, said piston during movement thereof relative to said housing and to said output shaft sliding with the corners thereof along the internal boundary and thereby valving the gas exchange channels in said housing, the improvement essentially consisting of first eccentric means on said output shaft, second eccentric means rotatable relative to said first eccentric means for eccentrically supporting said piston with respect to said first eccentric means, and means for imparting a rotary movement to said piston relative to both said first and second eccentric means including first control means controlling the rotation of said second means relative to said first eccentric means and second control means controlling the rotation of said piston relative to said second eccentric means.

16. A rotary piston internal combustion engine constructed as diesel engine in which a polygonal piston is eccentrically supported on the output shaft within a housing provided with an internal boundary, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means, and said piston being provided with a combustion space formed by a recess in each of the piston flanks extending between two respective corners thereof, each combustion space extending in the longitudinal direction of a respective piston flank and corresponding essentially to the compression volume.

17. A rotary piston engine according to claim 16, wherein each combustion space is constructed substantially rectangular in cross section.

18. A rotary piston engine according to claim 16, wherein each combustion space is constructed substantially omega-shaped in cross section.

19. A rotary piston engine according to claim 16, wherein each combustion space is constructed substantially trapezoidally-shaped in cross section.

20. A rotary piston engine according to claim 16, wherein each combustion space essentially consists, as seen in cross section, of a substantially trapezoidally-shaped part and a semi-circular part adjoining said first-mentioned part.

21. A rotary piston internal combustion engine according to claim 16, wherein the lower boundary of the combustion space, as viewed in longitudinal cross section, lies approximately on a circular arc.

22. A rotary piston internal combustion engine according to claim 16, wherein the lower boundary of the combustion space, as viewed in longitudinal cross section, is inclined in the leading combustion space portion, as seen in the direction of rotation of the piston, in a direction opposite to said direction of rotation.

23. A rotary piston internal combustion engine constructed as diesel engine in which a polygonal piston is eccentrically supported on the output shaft within a housing provided with an internal boundary, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means, and said piston being provided with a combustion space formed by a recess in each of the piston flanks extending between two respective corners thereof, each combustion space extending in the longitudinal direction of a respective piston flank and corresponding essentially to the compression volume, and multi-apertured nozzle means in said housing for injecting fuel against the bottom of the combustion space in said piston.

24. A rotary piston internal combustion engine constructed as diesel engine in which a polygonal piston is eccentrically supported on the output shaft within a housing provided with an internal boundary, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means, and said piston being provided with a combustion space formed by a recess in each of the piston flanks extending between two respective corners thereof, each combustion space extending in the longitudinal direction of a respective piston flank and corresponding essentially to the compression volume, and multi-apertured nozzle means in said housing for injecting fuel against the upper portions of the lateral walls of the combustion space in said piston.

25. A rotary piston internal combustion engine constructed as diesel engine in which a polygonal piston is eccentrically supported on the output shaft within a housing provided with an internal boundary, and in which the piston during movement thereof relative to said housing and to said output shaft slides with the corners thereof along said internal boundary and thereby valves the gas exchange channels of the engine, comprising means including eccentric means rigidly secured at said output shaft and eccentric bushing means rotatably supported on said first-mentioned eccentric means for rotatably supporting said piston with respect to said first-mentioned eccentric means and with respect to said eccentric bushing means, first transmission means for controlling the rotary movements of said piston relative to said eccentric bushing means, and second transmission means for controlling the rotary movements of said eccentric bushing means relative to said first-mentioned eccentric means, and said piston being provided with a combustion space formed by a recess in each of the piston flanks extending between two respective corners thereof, each combustion space extending in the longitudinal direction of a respective piston flank and corresponding essentially to the compression volume, and multi-apertured nozzle means in said housing for injecting fuel against the upper portions of the lateral walls of the combustion space in said piston and for additionally injecting fuel against a raised portion at the bottom of a respective combustion space.

26. A rotary piston internal combustion engine, comprising housing means having an internal boundary provided with two zones in proximity to the axis, output shaft means, triangularly shaped piston means within said housing means, gas exchange channel means within said housing means to provide for the admission and discharge of combustion air, said piston sliding along said internal boundary with the corners thereof during movement of said piston relative to said housing means and said output shaft means and simultaneously therewith valving said channel means during such movement, first means for eccentrically supporting said piston means with respect to said output shaft means including eccentric bushing means, second means for supporting said piston means on said output shaft means eccentrically with respect to said first means including eccentric means on said output shaft means on which said eccentric bushing means is rotatably supported, and means for imparting to said piston means rotary movements relative to both said first and second eccentric means including transmission means for controlling the rotating movement of said piston means relative to said eccentric bushing means and further transmission means for controlling the rotary movement of said eccentric bushing means about said output shaft means.

References Cited by the Examiner
UNITED STATES PATENTS

| | | | |
|---|---|---|---|
| 2,947,290 | 8/1960 | Froede | 123—8 |
| 2,988,065 | 6/1961 | Wankel et al. | 123—8 |

SAMUEL LEVINE, *Primary Examiner.*

LAURENCE V. EFNER, JOSEPH H. BRANSON, JR., *Examiners.*

F. T. SADLER, *Assistant Examiner.*